(12) United States Patent
Kim et al.

(10) Patent No.: US 11,716,707 B2
(45) Date of Patent: *Aug. 1, 2023

(54) METHOD BY WHICH TERMINAL SIMULTANEOUSLY TRANSMITS MESSAGES IN AT LEAST TWO CARRIERS IN WIRELESS COMMUNICATION SYSTEM SUPPORTING DEVICE TO DEVICE COMMUNICATION, AND APPARATUS THEREFOR

(71) Applicant: LG Electronics Inc., Seoul (KR)

(72) Inventors: Heejin Kim, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,902

(22) Filed: Nov. 18, 2021

(65) Prior Publication Data

US 2022/0078761 A1 Mar. 10, 2022

Related U.S. Application Data

(63) Continuation of application No. 16/636,574, filed as application No. PCT/KR2018/009288 on Aug. 13, 2018, now Pat. No. 11,191,059.

(Continued)

(51) Int. Cl.
*H04W 72/02* (2009.01)
*H04W 28/02* (2009.01)
(Continued)

(52) U.S. Cl.
CPC ....... *H04W 72/02* (2013.01); *H04W 28/0252* (2013.01); *H04W 72/0453* (2013.01); *H04W 72/1263* (2013.01); *H04W 72/569* (2023.01)

(58) Field of Classification Search
CPC ............. H04W 72/02; H04W 72/0453; H04W 72/1242; H04W 72/1263; H04W 72/10;
(Continued)

(56) References Cited

U.S. PATENT DOCUMENTS

| 2009/0067447 A1 | 3/2009 | Giaimo et al. |
| 2016/0081039 A1 | 3/2016 | Lindoff et al. |

(Continued)

FOREIGN PATENT DOCUMENTS

| KR | 20140098168 | 8/2014 |
| KR | 20160068844 | 6/2016 |
| WO | WO2016117936 | 7/2016 |

OTHER PUBLICATIONS

PCT International Search Report and Written Opinion in International Application No. PCT/KR2018/009288, 10 pages.

*Primary Examiner* — Ricardo H Castaneyra
(74) *Attorney, Agent, or Firm* — Fish & Richardson P.C.

(57) ABSTRACT

According to various embodiments, disclosed are a method by which a terminal simultaneously transmits messages in at least two carriers in a wireless communication system supporting device to device (D2D) communication, and an apparatus therefor. Particularly, disclosed are a method by which a terminal simultaneously transmits messages in at least two carriers, and an apparatus therefor, the method comprising the steps of: independently sensing, by a carrier, a transmission resource, and calculating the ratio of transmission resources, which can be simultaneously transmitted on at least two carriers, on the basis of a result of the sensing by the carrier; setting the sensed transmittable transmission resource as a transmission candidate resource when the calculated transmission resource ratio is greater than or equal to a preset threshold ratio; and selecting a transmission resource to be used for the message transmission in each of (Continued)

at least two carriers within the transmission candidate resource.

14 Claims, 16 Drawing Sheets

Related U.S. Application Data

(60) Provisional application No. 62/565,129, filed on Sep. 29, 2017, provisional application No. 62/544,086, filed on Aug. 11, 2017.

(51) Int. Cl.
  *H04W 72/1263* (2023.01)
  *H04W 72/0453* (2023.01)
  *H04W 72/566* (2023.01)

(58) Field of Classification Search
  CPC ......... H04W 28/0252; H04W 28/0289; H04W 88/04; H04L 5/0037; H04L 5/0094; H04L 5/001
  See application file for complete search history.

(56) References Cited

U.S. PATENT DOCUMENTS

| | | |
|---|---|---|
| 2016/0183276 A1 | 6/2016 | Marinier et al. |
| 2017/0006606 A1 | 1/2017 | Matsuo et al. |
| 2017/0027013 A1 | 1/2017 | Kim et al. |
| 2017/0164258 A1 | 6/2017 | Luo et al. |
| 2017/0201461 A1 | 7/2017 | Cheng et al. |
| 2019/0182840 A1 | 6/2019 | Feng et al. |
| 2020/0059821 A1 | 2/2020 | Wirth et al. |
| 2020/0068534 A1 | 2/2020 | Li et al. |

METHOD BY WHICH TERMINAL SIMULTANEOUSLY TRANSMITS MESSAGES IN AT LEAST TWO CARRIERS IN WIRELESS COMMUNICATION SYSTEM SUPPORTING DEVICE TO DEVICE COMMUNICATION, AND APPARATUS THEREFOR

CROSS-REFERENCE TO RELATED APPLICATIONS

This application is a continuation of U.S. application Ser. No. 16/636,574, filed on Feb. 4, 2020, which is a National Stage application under 35 U.S.C. § 371 of International Application No. PCT/KR2018/009288, filed on Aug. 13, 2018, which claims the benefit of U.S. Provisional Application No. 62/565,129, filed on Sep. 29, 2017, and U.S. Provisional Application No. 62/544,086, filed on Aug. 11, 2017. The disclosures of the prior applications are incorporated by reference in their entirety.

TECHNICAL FIELD

The present disclosure relates to a wireless communication system supporting device-to-device (D2D) communication, and more particularly, to a method for a terminal to simultaneously transmit a message on at least two carriers and apparatus therefor.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

SUMMARY

The object of the present disclosure is to solve problems in half-duplex. Specifically, the object of the present disclosure is to secure transmission resources available for simultaneous transmission of a message on at least two carriers as many as possible by configuring and selecting transmission resources available for message transmission in consideration of the ratio of the transmission resources available for the simultaneous transmission (among resources included in the at least two carriers) in carrier aggregation transmission.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, provided herein is a method of simultaneously transmitting, by a user equipment (UE), a message on at least two carriers in a wireless communication system supporting D2D communication. The method may include sensing transmission resources independently for each carrier and calculating a ratio of transmission resources available for simultaneous transmission on the at least two carriers based on results of the sensing for each carrier, determining the sensed transmission resources available for transmission as candidate transmission resources when the calculated transmission resource ratio is greater than or equal to a predetermined threshold ratio, and selecting a transmission resource to be used for the message transmission on each of the at least two carriers from among the candidate transmission resources.

For each of the at least two carriers, the transmission resource to be used for the message transmission may be randomly selected from among the transmission resources available for the simultaneous transmission.

The UE may determine one transmission time from among transmission timings of the transmission resources available for the simultaneous transmission, and a transmission resource at the determined one transmission time may be selected as the transmission resource for each of the at least two carriers.

The one transmission time may be determined with respect to a carrier with a low congestion level among the at least two carriers.

A congestion level may be determined based on a channel busy ratio (CBR), which means a ratio of occupied channels in each carrier.

The one transmission time may be determined by considering at least one of the priority of the message, the reliability level of the message, or the latency requirement of the message.

The sensing of the transmission resources available for the transmission may be performed on a subchannel basis for each carrier.

The transmission resources available for the simultaneous transmission may be transmission resources included in the same transmission time unit among transmission resource included in each of the at least two carriers.

When the calculated transmission resource ratio is smaller than the predetermined threshold ratio, the UE may decrease the predetermined threshold ratio and compare the calculated transmission resource ratio thereto.

The method may further include simultaneously transmitting, by the UE, the message on the at least two carriers based on the selected transmission resources.

The determination of the candidate transmission resources may be performed by a physical layer of the UE, and the determined candidate transmission resources may be reported by the physical layer to a higher layer of the UE.

The measurement and sensing of the transmission resources available for the transmission for each carrier may be performed by the physical layer of the UE, and the calculation of the ratio of the transmission resources available for the simultaneous transmission and the determination of the candidate transmission resources may be performed by the higher layer of the UE.

The method may further include selecting, by the UE, the at least two carriers for carrier aggregation (CA) transmission. Or, according to an embodiment of the present disclosure, the processor is configured to receive a user input to switch the drive mode from an autonomous mode to a manual mode, or to switch from a manual mode to an autonomous mode.

According to the present disclosure, transmission resources available for simultaneous transmission of a message on at least two carriers may be secured as many as possible by configuring and selecting transmission resources available for message transmission in consideration of the ratio of the transmission resources available for the simultaneous transmission among resources included in at least two carriers.

Effects obtainable from the present invention are non-limited by the above-mentioned effects. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings.

DETAILED DESCRIPTION

Figure 1A:
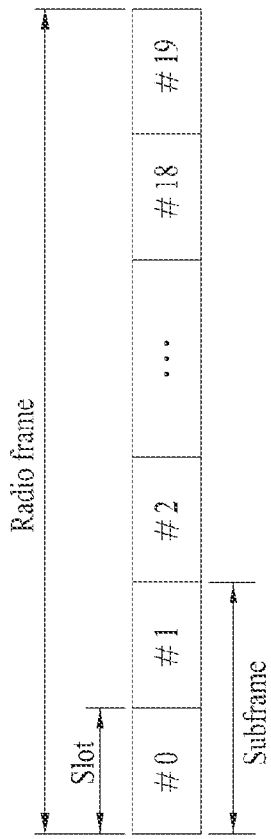
FIGS. 1A and 1B are views illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIGS. 1A and 1i, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1A illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

Figure 1B:
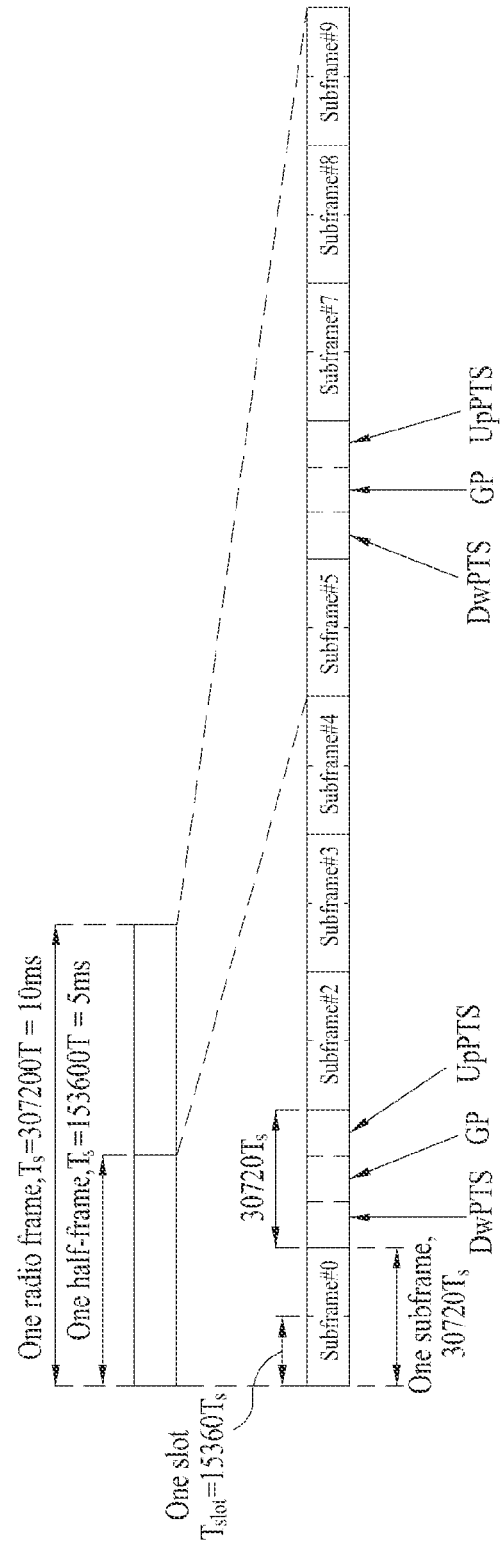

FIG. 1B illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
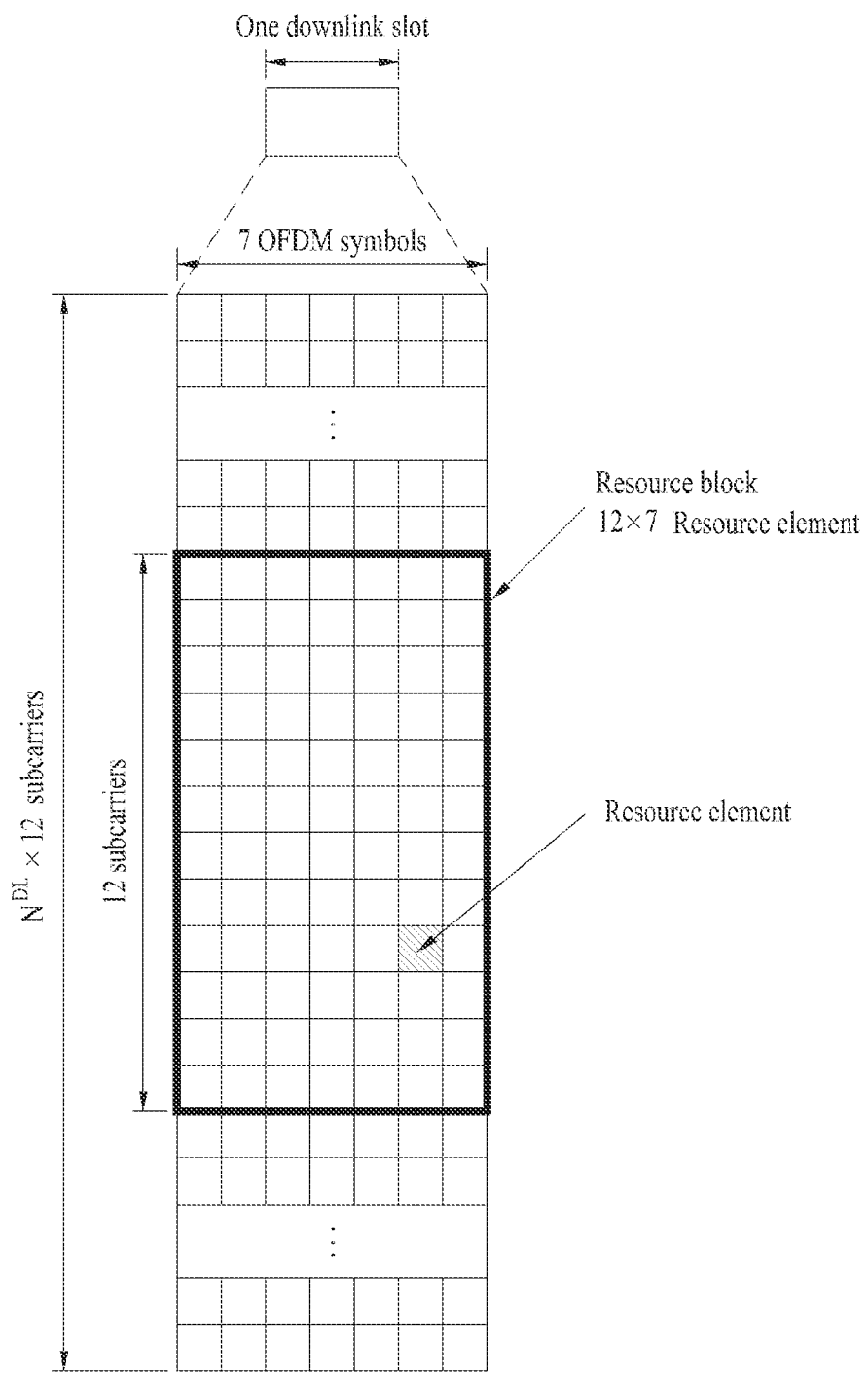
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
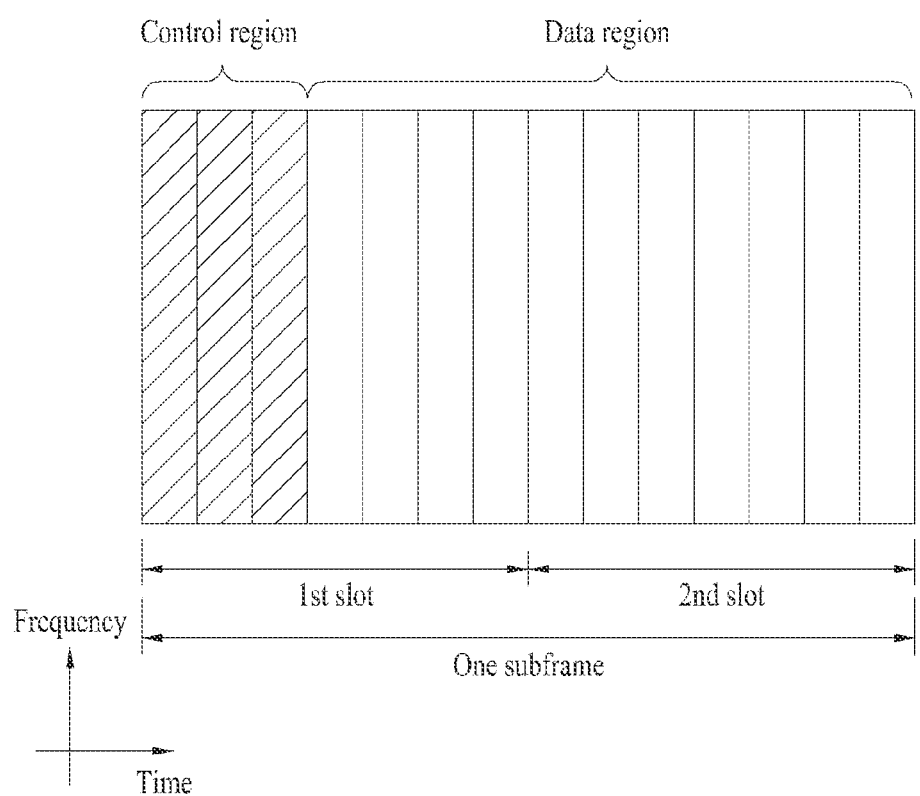
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
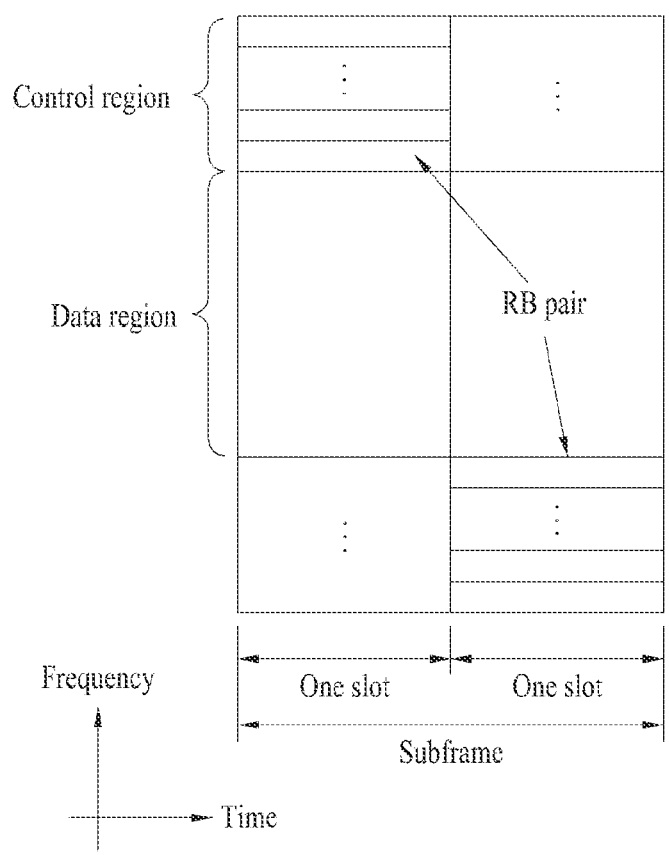
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5A:
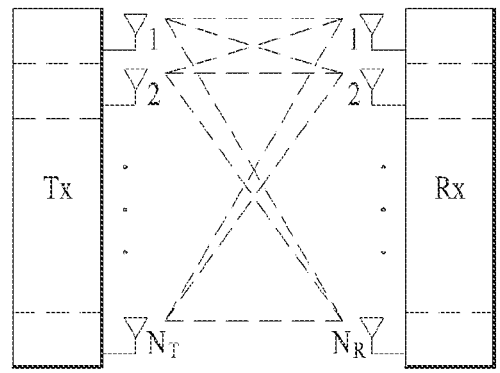
FIGS. 5A and 5B are views illustrating the configuration of a wireless communication system having multiple antennas.
Figure 5B:
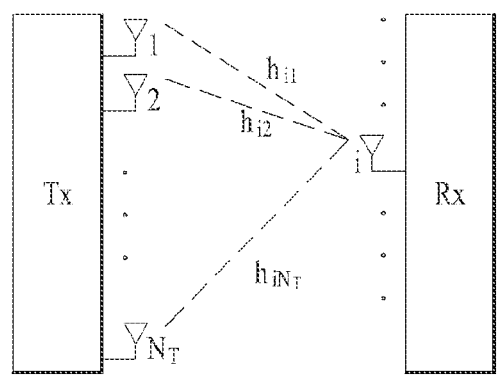

FIGS. 5A and 5B are diagrams illustrating a configuration of a wireless communication system having multiple antennas.

As shown in FIG. 5A, if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{Equation 1}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \cdots, s_{N_T}]^T \quad \text{Equation 2}$$

Meanwhile, transmit powers can be set different from each other for individual pieces of transmission information $s_1, s_2, \cdots, s_{N_T}$, respectively. If the transmit powers are set to $P_1, P_2, \cdots, P_{N_T}$, respectively, the transmission information with adjusted transmit powers can be represented as Equation 3.

$$\hat{s}=[\hat{s}_1,\hat{s}_2,\cdots,\hat{s}_{N_T}]^T=[P_1 s_1, P_2 s_2, \cdots, P_{N_T} s_{N_T}]^T \quad \text{Equation 3}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Equation 4}$$

Assuming a case of configuring $N_T$ transmitted signals $x_1, x_2, \cdots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \cdots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{Equation 5}$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \cdots, y_{N_R}$ of the antennas can be expressed as follows.

$$y=[y_1, y_2, \cdots, y_{N_R}]^T \quad \text{Equation 6}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5B is a diagram illustrating channels from the $N_T$ Tx antennas to the Rx antenna i. The channels may be combined and expressed in the form of a vector and a matrix. In FIG. 5B, the channels from the $N_T$ Tx antennas to the Rx antenna i can be expressed as follows.

$$h_i^T=[h_{i1}, h_{i2}, \cdots, h_{iN_T}] \quad \text{Equation 7}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{Equation 8}$$

An AWGN (Additive White Gaussian Noise) is added to the actual channels after a channel matrix H. The AWGN $n_1, n_2, \cdots, n_{N_R}$ respectively added to the $N_R$ Rx antennas can be expressed as follows.

$$n=[n_1, n_2, \cdots, n_{N_R}]^T \quad \text{Equation 9}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{Equation 10}$$

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{Equation 11}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/

LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
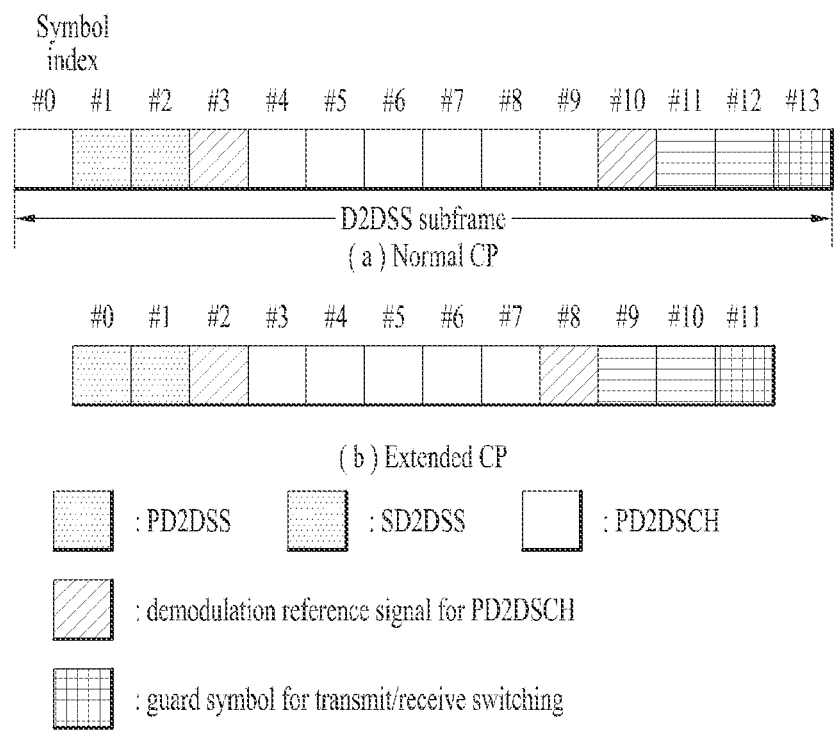
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
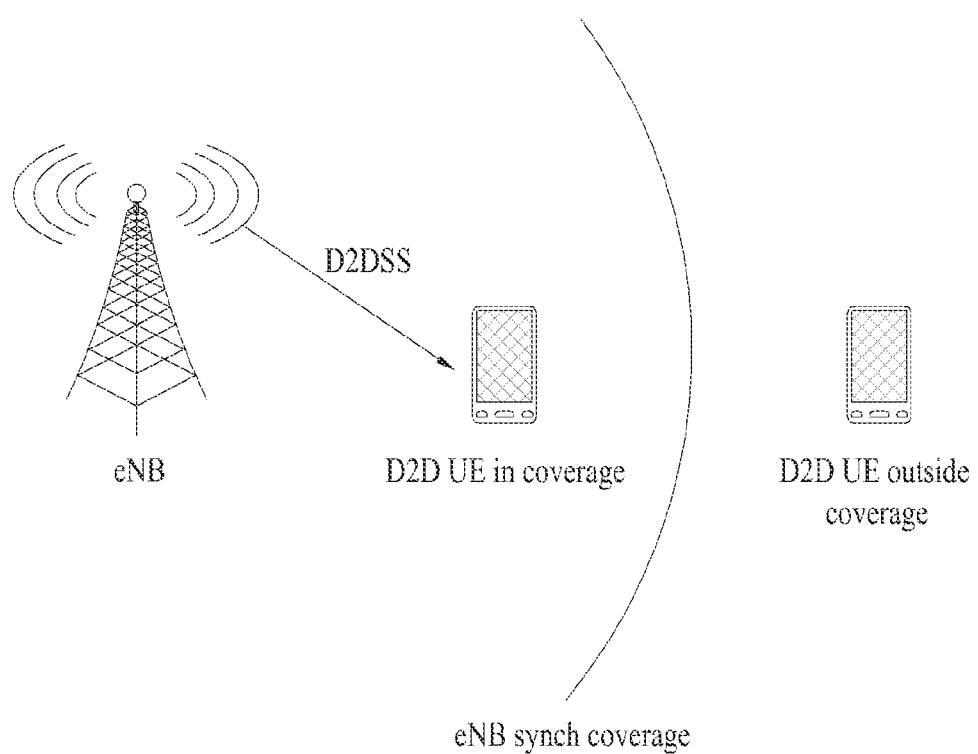
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8A:
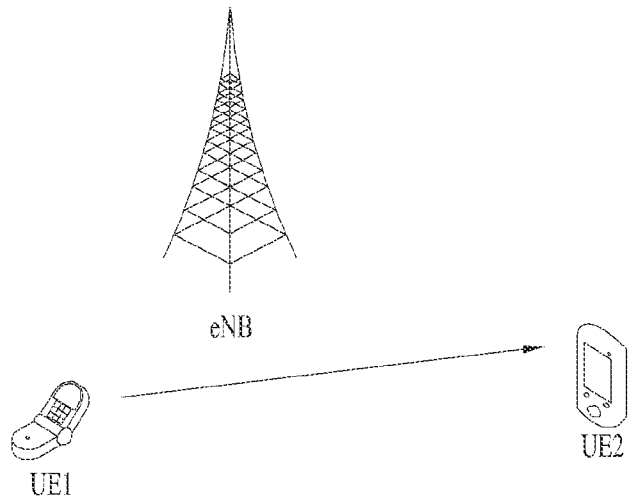
FIGS. 8A and 8B are views illustrating an exemplary D2D resource pool for D2D communication.
Figure 8B:
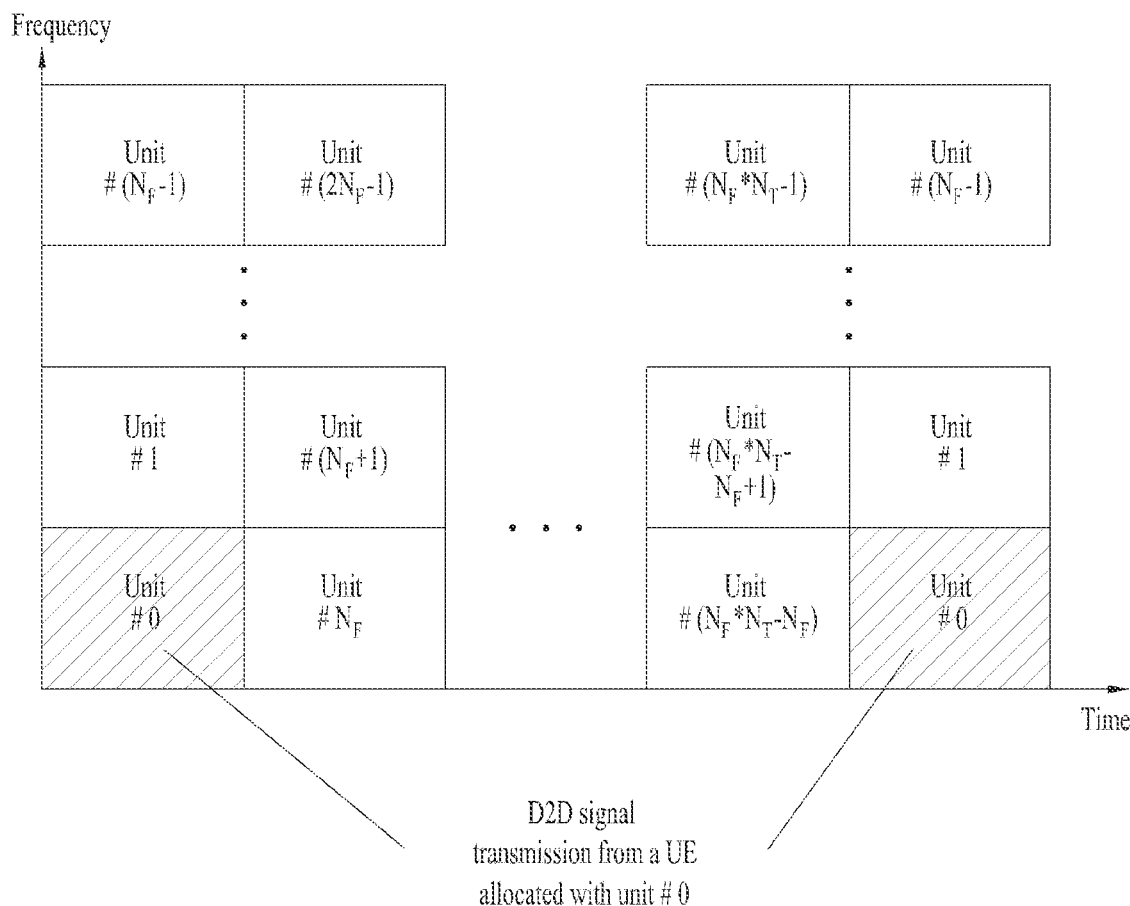

FIGS. 8A and 8B show an example of a first UE (UE1), a second UE (UE2) and a resource pool used by UE1 and UE2 performing D2D communication. In FIG. 8A, a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8B shows an example of configuring a resource unit. Referring to FIG. 8B, the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIGS. 8A and 8B, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 9A:
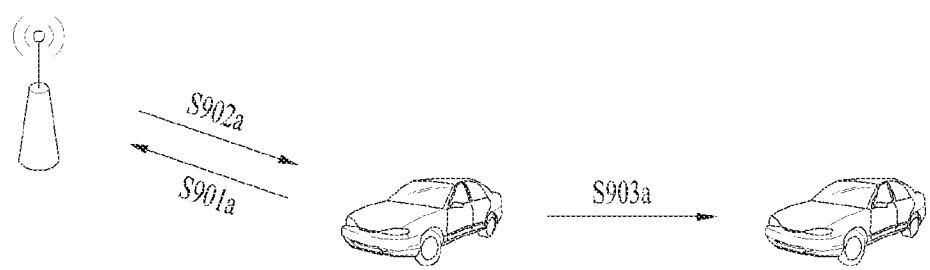
FIGS. 9A and 9B are views referred to for describing transmission modes and scheduling schemes for vehicle-to-everything (V2X)
Figure 9B:
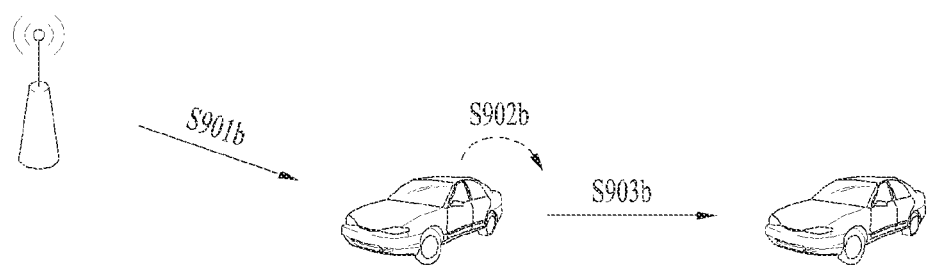
Figure 10:
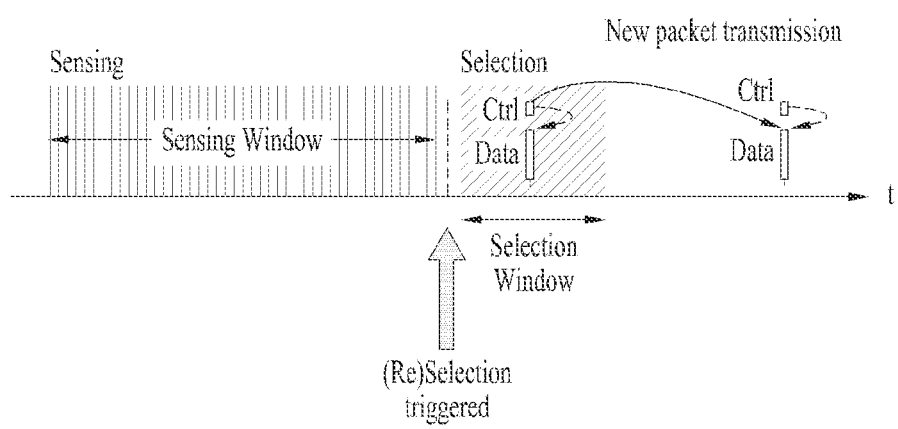
FIG. 10 is a view illustrating a method of selecting resources in V2X.
Figure 11:
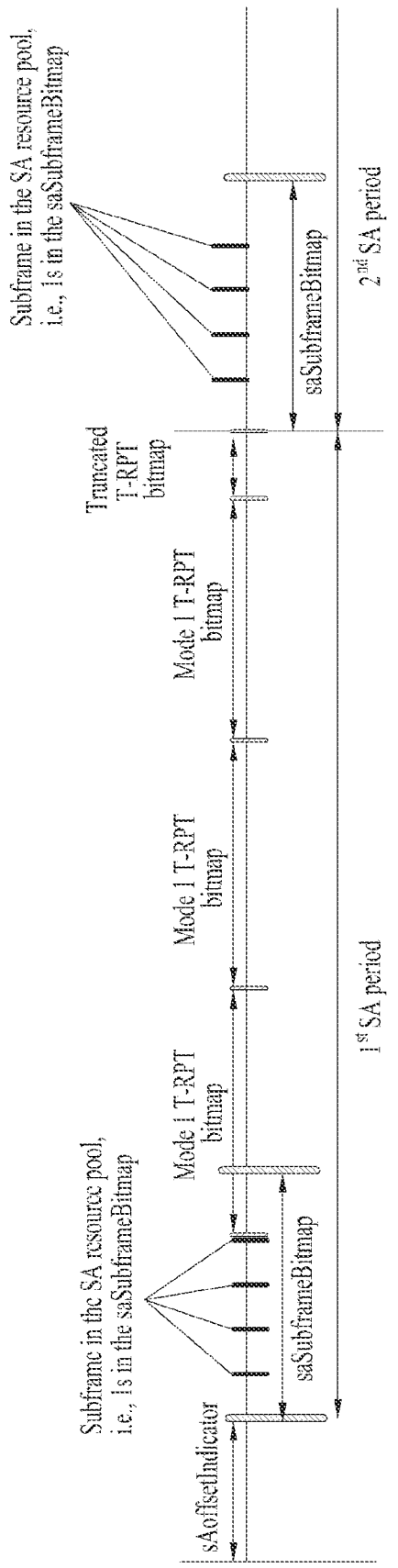
FIG. 11 is a view referred to for describing a scheduling assignment (SA) and data transmission in D2D.

In V2X, sidelink transmission mode 3 based on centralized scheduling and sidelink transmission mode 4 based on distributed scheduling are available. FIGS. 9A and 9B illustrates scheduling schemes according to these two transmission modes. Referring to FIGS. 9A and 9B, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9B, a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIGS. 9A and 9B. Referring to FIGS. 9A and 9B, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to is in a T-RPT bitmap, and one MAC PDU is transmitted four times.

Figure 12:
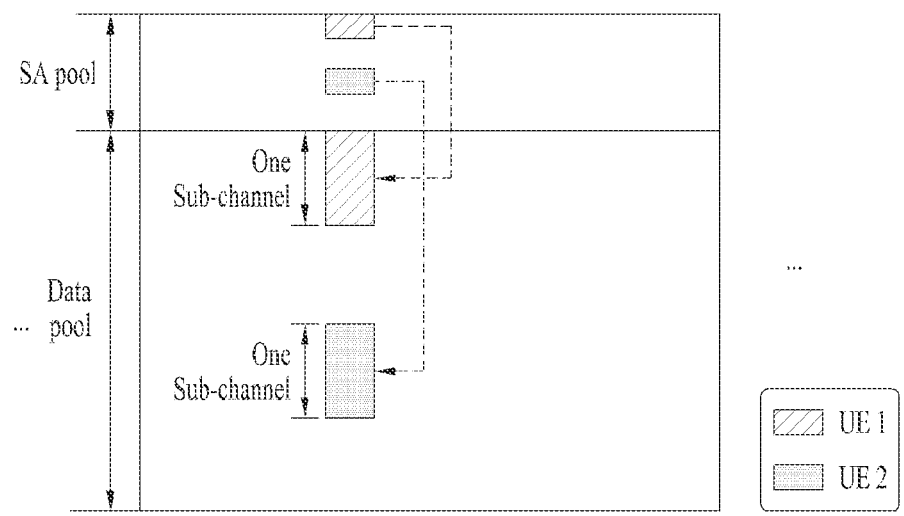
FIG. 12 is a view referred to for describing an SA and data transmission in V2X.
Figure 12:
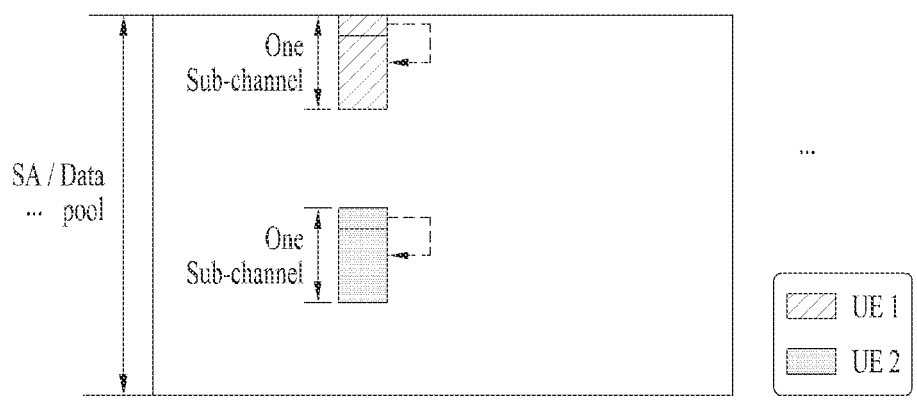

Unlike D2D, an SA (PSCCH) and data (PSSCH) are transmitted in FDM in V2X, that is, sidelink transmission mode 3 or 4. Because latency reduction is a significant factor in V2X in view of the nature of vehicle communication, an SA and data are transmitted in FDM in different frequency resources of the same time resources. Examples of this transmission scheme are illustrated in FIG. 12. An SA and data may not be contiguous to each other as illustrated in FIG. 12 or may be contiguous to each other as illustrated in FIG. 12. Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
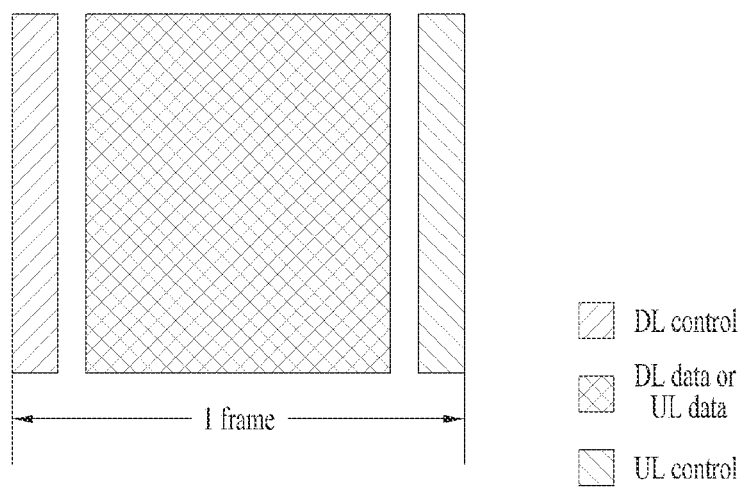
FIGS. 13 and 14 is a view illustrating a new radio access technology (NRAT) frame structure.
Figure 14:
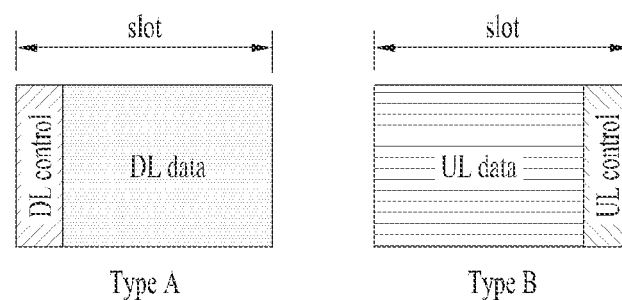
Figure 14:
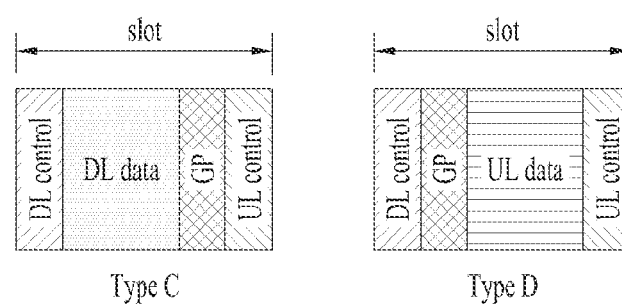

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like).

Meanwhile, carrier aggregation may be applied to D2D communication to improve data transfer rates or reliability. For example, upon receiving signals on aggregated carriers, a receiving UE may perform combining or joint-decoding thereon or forward decoded signals to higher layers so as to perform (soft) combining on the signals which are transmitted on the different carriers. For such operation, the receiving UE needs to know which carriers are aggregated, that is, which signals on which carriers the receiving UE needs to combine. Accordingly, the radio resources on the aggregated carriers needs to be informed. In 3GPP Rel. 14 V2X, a transmitting UE directly indicates the location of a time-frequency resource for transmitting data (PSSCH) using a control signal (PSCCH). If the carrier aggregation is indicated by the PSCCH, an additional bit field may be required for the indication. However, the remaining reserved bits of the PSCCH are about 5 to 7 bits, and these bit are insufficient. Hence, a method capable of indicating radio resources on aggregated carriers is required, and details thereof will be described in the following.

Sensing and Resource Selection in Sidelink Carrier Aggregation

When a message is transmitted based on carrier aggregation (CA), a vehicle UE (or UE) may be incapable of performing transmission and reception on multiple carriers at the same time due to limitations on its UE capability. That is, while performing transmission on a specific carrier, the UE may not perform reception on another carrier which (fully or partially) overlaps with the corresponding time point. In the case of CA-based transmission (CA transmission), if a UE transmits a message by separating multiple carriers, the number of times (or subframes) where reception is disabled may increase. In this case, the overall system performance may be degraded due to sensing performance degradation of the UE.

Therefore, a method of performing sensing and resource selection in consideration of the capability of the vehicle UE (or UE) is required to select resources for CA transmission at most at the same time (for example, to select transmission resources available for fully/partially-simultaneous transmission between carriers), and details thereof will be described hereinafter. Meanwhile, if sensing and resource selection are performed per carrier as in Release 14, the number of candidate transmission resources available for CA transmission on each carrier at a specific transmission time may significantly decrease or become zero.

The CA transmission may be supported in D2D and V2X communication. That is, a message may be transmitted on at least two carriers. In this case, if the UE performs transmission by separating multiple carriers based on its UE capability, its reception performance may be significantly degraded due to the half-duplex problem. Thus, in the case of the CA transmission, the UE may need to perform transmission on multiple carriers at the same time.

When sensing is performed for each carrier as in the prior art, if the ratio of transmission resources where per-carrier transmission is enabled is greater than or equal to a predetermined ratio, a signal may be transmitted on a carrier. However, the number of transmission resources available for simultaneous transmission on at least two carriers may significantly decrease or become zero. Thus, the transmission resources available for the simultaneous transmission on the at least two carriers may be determined from among the transmission resources where the per-carrier transmission is enabled. By considering the ratio of the determined transmission resources to transmission resources in the at least two carriers, carriers for message transmission and candidate transmission resources need to be determined.

In the present disclosure, the term "reception" may be interpreted to mean at least one of the following terms: "control/data channel reception/decoding", "synchronization signal reception", "sensing operation (e.g., S-RSRP, S-RSSI)", and "CBR measurement operation".

Herein, fully-simultaneous transmission between carriers may mean that the UE transmits a message on multiple carriers at the same time. In addition, the simultaneous transmission may mean that a unit (i.e., a time unit, for example, a transmission time interval) in which one transmission is performed fully overlaps with another one. Partially-simultaneous transmission between carriers may mean that the UE transmits messages on at least two carriers among multiple carriers at the same time. Separate transmission between carriers may mean that when the UE transmits a message on multiple carriers, the UE transmits the message on only one component carrier (CC) within one transmission time interval (TTI) at all times.

In the fully-simultaneous transmission, partially-simultaneous transmission, and separate transmission, the same or different messages may be transmitted on multiple carriers. Alternatively, the transmitted messages may be partially the same or different.

In the following, a scenario of performing the fully-simultaneous transmission between carriers is assumed for convenience of description, but the present disclosure is also applicable to a scenario of performing the partially-simultaneous transmission between carriers and a scenario of performing the separate transmission.

Depending on which one of the fully-simultaneous transmission, partially-simultaneous transmission, and separate transmission is used or allowed (it is predetermined or signaled), a different carrier selection process may be applied. For example, when the fully-simultaneous transmission or partially-simultaneous transmission is used, carrier selection may be performed based on a relatively low CBR threshold, compared to the separate transmission. That is, in the case of the separate transmission, UE transmission power does not need to be divided between multiple carriers at a specific time, and thus coverage may be secured in an environment with a high CBR. Alternatively, one of the fully-simultaneous transmission, partially-simultaneous transmission, and separate transmission may be applied or allowed depending whether selected carriers satisfy predetermined conditions. For example, if any one of the average, maximum, and minimum CBR values of the selected carriers is lower than a predetermined threshold, one of the fully-simultaneous transmission and partially-simultaneous transmission may be allowed. If any one of the average, maximum, and minimum CBR values of the selected carriers or a CBR difference between the selected carriers (i.e., some, all, minimum, or maximum values) is higher than the predetermined threshold, the separate transmission may be used.

According to an embodiment, the UE may form candidate transmission resources to be used within a resource selection/reselection window based on a two-step approach. That is, the UE may determine resources satisfying a two-step condition as the candidate transmission resources. Specifically, the UE may select candidate resources (e.g., subchannels) by performing sensing for each carrier (i.e., per-carrier sensing) (in the case of a Release-14 UE) (Step 1). Next, by considering a condition that the ratio of candidate transmission resources (overlapped subframe resource candidates over TX carriers) on multiple carriers, which are obtained by the sensing results in Step 1, at the same transmission time (e.g., subframe) needs to be higher than or equal to a specific threshold (TH_Value [%]) (which is preconfigured or signaled), the UE may form the final candidate transmission resources.

Next, the UE may select actual transmission resources based on the configured candidate transmission resource. In this case, the UE may select the actual transmission resources for each carrier in a random way (for example, a CA resource selection method for a Release-14 UE) (first selection method). Alternatively, the UE may select the actual transmission resources as follows: the UE selects a set of transmission time units (e.g., subframes) including transmission resources available for the fully/partially-simultaneous transmission and then selects the actual transmission resources among candidate resources available for the fully/partially-simultaneous transmission in the selected transmission time unit set independently for each carrier (second selection method). Further, the UE may select the actual transmission resources as follows: the UE selects a specific (fixed) transmission time (e.g., an N-th subframe) among transmission time units (e.g., subframes) including transmission resources available for the fully/partially-simultaneous transmission among candidate transmission resources (e.g., candidate transmission resources configured according to the proposed method (step 1)) and then selects the actual transmission resources for some/all transmission carriers at the corresponding time (third selection method).

According to the third selection method, the transmission resources available for the fully/partially-simultaneous transmission are selected from among the final candidate transmission resources. Next, according to predetermined specific criteria, the specific transmission time (e.g., N-th subframe) is selected from the transmission time unit set (e.g., subframe set) corresponding to the selected transmission resources available for the simultaneous transmission. Then, a resource corresponding to the selected specific transmission time is determined as the actual transmission resources for some or all of the transmission carriers. The operation of selecting the specific transmission time according to the specific criteria may be interpreted to mean that for a specific carrier (carrier #X), the actual transmission resources are selected from the transmission time unit set corresponding to the selected transmission resources available for the simultaneous transmission according to the specific criteria. Since the actual transmission resources are selected from the transmission time unit set corresponding to the transmission resources available for the simultaneous transmission, the operation may be regarded as selecting an actual transmission timing applicable to some or all of the transmission carriers. In the third selection method, the specific criteria for selecting the specific transmission time are as follows. When a carrier for which the specific transmission time is selected is defined as "carrier #X(s)", the carrier #X(s) may be: (1) a specific carrier(s) predefined or configured by the network; (2) a carrier(s) with high carrier priority; (3) a carrier(s) with low congestion (for example, a carrier(s) with a low traffic load; (4) a carrier(s) with a low CR measurement value; (5) a carrier(s) for transmitting a message with high priority; (6) a carrier(s) for transmitting a message with a low-latency requirement; (7) a carrier(s) for transmitting a message with a high/low-reliability requirement; or (8) a randomly selected carrier(s).

Meanwhile, regarding (7), the specific time may be determined with respect to high reliability. For example, when the carrier #X is a carrier for transmitting data that requires high reliability, a transmission time may be selected with respect to a carrier with a low traffic load among at least two carriers, and transmission resources at the selected transmission time may be selected as resources for other carriers. That is, when reliability is prioritized, a resource at a transmission time with the lowest traffic load may be preferentially selected as the actual transmission resource even if there is a small delay. For example, when a message is delivered to share sensor data between low-degree automation level vehicles, the reliability may be prioritized as described above.

Since each of the examples of the proposed methods may be included as one method for implementing the present disclosure, it is apparent that each example may be regarded as a proposed method. In addition, although the proposed methods may be implemented independently, some of the proposed methods may be combined (or merged) for implementation. Moreover, it may be regulated that information on whether the proposed methods are applied (or information on rules related to the proposed methods) should be transmitted from an eNB to a UE through a predefined signal (e.g., a physical layer signal, a higher layer signal, etc.).

Meanwhile, both the selection of carriers for CA transmission and the selection of actual transmission resources may not be processed by the physical layer. For example, a transmission resource candidate (or a first candidate resource) may be selected by the physical layer, but an actual transmission resource for transmitting a message may be selected by the higher layer (e.g., MAC layer). Specifically, the physical layer may report to the higher layer the measurement value(s) (e.g., RSRP) of one or multiple candidate transmission resources selected according to specific criteria and/or the time or frequency indices of the selected resources.

In the above-described methods, transmission resources available for simultaneous transmission may be selected from among sensed transmission resources available for transmission, and information on the selected transmission resources may be provided to the higher layer. Alternatively, both information on the sensed transmission resources available for the transmission and information on the transmission resources available for the simultaneous transmission may be provided to the higher layer. However, the present disclosure is not limited thereto.

According to an embodiment of the present disclosure, the physical layer of the UE may perform sensing for N carriers from carrier #1, . . . , carrier #N, and report information about all candidate transmission resources for the N carriers to the higher layer. The higher layer of the UE may check whether the ratio of transmission resources available for transmission at the same transmission time to the candidate transmission resources reported from the physical layer is greater than or equal to a threshold and then select a transmission carrier and an actual transmission resource. Alternatively, if multiple carrier combinations are capable of being considered by the higher layer, the UE may select a carrier for message transmission from among multiple carriers for CA transmission according to additional criteria such CR, CBR, etc.

Alternatively, the physical layer may perform sensing for all of the N carriers from carrier #1, . . . , carrier #N, autonomously select some carriers suitable for the CA transmission based thereon, report to the higher layer candidate resources available for the selected carriers. Then, the higher layer may select an actual transmission resource based on the indices of the carriers and the candidate transmission resources, which are selected by the physical layer.

Meanwhile, depending on the sensing results for each carrier, the ratio of the resources available for the fully-simultaneous transmission or partially-simultaneous transmission to the selected resources may not satisfy a predetermined reference value (TH_Value [%]). In this case, the candidate transmission resources satisfying the two conditions may not be selected or formed. However, according to the following operations, the candidate transmission resources may be formed within the sensing results.

The UE may attempt to secure more available candidate transmission resources by adjusting the value of TH_Value (for example, decreasing the value of TH_Value).

To create the candidate transmission resources stratifying the given value of TH_Value, the UE may perform the following operations: (1) increasing the threshold of PSSCH-RSRP for each carrier: and (2) changing the relative ratio of minimum resources that the UE secures (for example, about 20% in Release-14).

To secure more candidate transmission resources than those created by the proposed method (Step 1), Steps 1 and 2 may be repeated. In this case, the repetition may be performed by only the physical layer or both the physical and higher layers. Alternatively, the UE may attempt the partially-simultaneous transmission instead of the fully-simultaneous transmission. Specifically, the UE may group carriers where the UE is capable of securing transmission resources at the same transmission time and then attempt the partially-simultaneous transmission between carriers on the minimum amount of transmission time resources.

As another method, transmission carriers for CA transmission may be selected by an application layer based on a report from a lower layer (e.g., a radio layer, RRC/MAC/PHY, etc.). In this case, to select the transmission carriers, the application layer may instruct the lower layer to report: (1) a congestion level measurement value such as CBR (and/or CR); (2) UE capability (e.g., the number of Tx and/or Rx chains); (3) a sensing result; and/or (4) a carrier index.

The present disclosure is not limited to D2D communication. That is, the disclosure may be applied to UL or DL communication, and in this case, the proposed methods may be used by an eNB, a relay node, etc. Since each of the examples of the proposed methods may be included as one method for implementing the present disclosure, it is apparent that each example may be regarded as a proposed method.

Figure 15A:
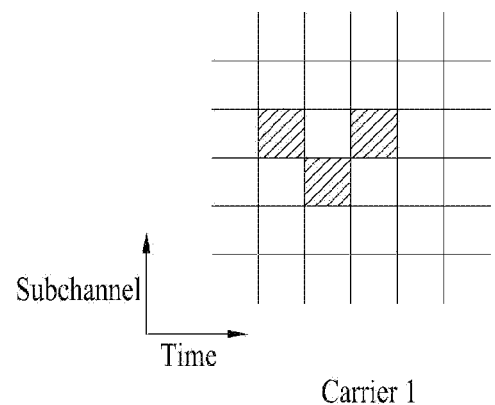
FIGS. 15A to 15C are diagrams for explaining a method of calculating the ratio of resources available for simultaneous transmission according to an embodiment of the present disclosure.
Figure 15B:
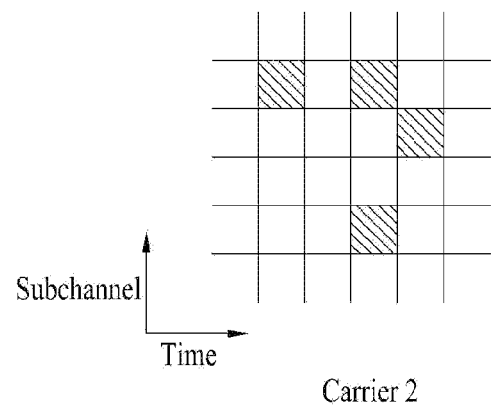
Figure 15C:
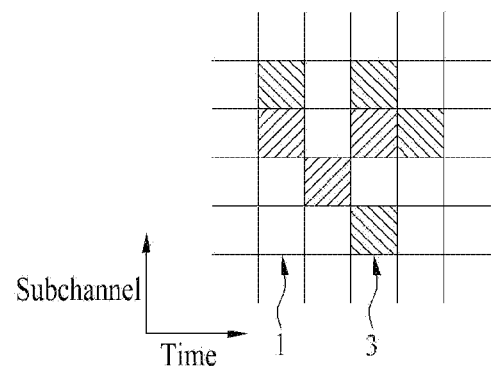

FIGS. 15A to 15C are diagrams for explaining a method of calculating the ratio of resources available for simultaneous transmission according to an embodiment of the present disclosure.

Referring to FIGS. 15A to 15C, a UE may sense transmission resources available for transmission for each carrier based on a per-carrier sensing method (Release-14). The UE may determine resources having received signal strength less than a predetermined value among resources included in each carrier as the transmission resources available for the transmission. For example, the UE may sense the hatched transmission resources shown in FIG. 15A as transmission resources available for transmission on carrier 1. In addition, the UE may sense the hatched transmission resources shown in FIG. 15B as transmission resources available for transmission on carrier 2. To determine the transmission resources available for the transmission, the UE may sense unoccupied transmission resources for each carrier by calculating the strength of a signal based on received signal strength indicator (RSSI), reference signal received quality (RSRQ), and reference signal received power (RSRP) or by considering a channel occupation ratio (CBR or CR) measured based on the signal strength. Meanwhile, the transmission resources may be sensed on a subchannel basis in the frequency domain or on a subframe basis in the time domain.

Next, the UE may check transmission resources available for simultaneous transmission on at least two carriers by considering the transmission resources available for the transmission, which are sensed for each carrier. The UE may calculate the ratio of the checked transmission resources available for the simultaneous transmission to the transmission resources (or sensed transmission resources) which are sensed for each carrier. For example, as shown in FIG. 15C, transmission resources corresponding to the same subframe among transmission resources included in carriers 1 and 2 may be selected as the transmission resources available for the simultaneous transmission. For example, with continued reference to FIG. 15C, the number of transmission resources available for the simultaneous transmission is 5, and the UE may determine whether the ratio (5/16) of the transmission resources available for the simultaneous transmission to the total resources (16) is greater than or equal to a predetermined threshold ratio. Alternatively, the number of time resources available for the simultaneous transmission is 2, and the UE may determine whether the ratio (2/4) of the time resources available for the simultaneous transmission to the total time resources (4) is greater than or equal to the predetermined threshold ratio.

When the ratio of the transmission resources is greater than or equal to the predetermined threshold ratio, the UE may configure or determine the sensed transmission resources available for the transmission as candidate transmission resources. That is, the UE may determine the candidate transmission resources such that the number of the transmission resources available for the simultaneous transmission is greater than or equal to a predetermined value. On the contrary, when the ratio of the transmission resources is smaller than the predetermined threshold ratio, the UE may increase the number of the transmission resources available for the transmission by adjusting a determination criterion (e.g., received signal strength, etc.) used in determining the transmission resources available for the transmission. Alternatively, the UE may increase the number of the transmission resources available for the simultaneous transmission among the transmission resources sensed for each carrier by decreasing the predetermined threshold ratio.

Next, after determining the candidate transmission resources, the UE may select a transmission resource for each of the at least two carriers among the candidate transmission resources. The transmission resource may be a transmission resource for transmitting a message on the at least two carriers. The UE may randomly select the transmission resource for each of the at least two carriers among the candidate transmission resources. However, in this case, the simultaneous transmission may not be guaranteed.

Accordingly, as shown in FIG. 15C, the UE may select transmission resources for carriers 1 and 2 from among resources in subframes (1 and 2) available for the simultaneous transmission among the transmission resources included in carriers 1 and 2. In other words, only transmission resources corresponding to first and third subframes may be selected as the transmission resources for carriers 1 and 2.

Alternatively, when the UE determines one of the first and third subframes as a subframe of the transmission resource for any one of carrier 1 or carrier 2, the UE may limit the subframe of the transmission resource for the other carrier to a subframe of the transmission resource for the any one carrier. For example, when the subframe of the transmission resource for carrier 1 is determined as the third subframe, the subframe of the transmission resource for carrier 2 is determined dependently as the transmission resource for the third subframe.

The physical layer of UE may sense the transmission resources available for the transmission for each carrier and provides the sensing results to the higher layer. The higher layer may calculate the ratio of the transmission resources available for the simultaneous transmission on the at least two carriers based on the sensed transmission resources available for the transmission. Then, by comparing the calculated transmission resource ratio with the predetermined threshold ratio, the higher layer may determine whether to set the sensed transmission resources available for the transmission as the candidate transmission resources.

Alternatively, the physical layer of the UE may sense the transmission resources available for the transmission and determine the candidate transmission resources. The higher layer may select the transmission resource to be used for transmitting the message on each of the at least two carriers among the candidate transmission resources.

Figure 16:
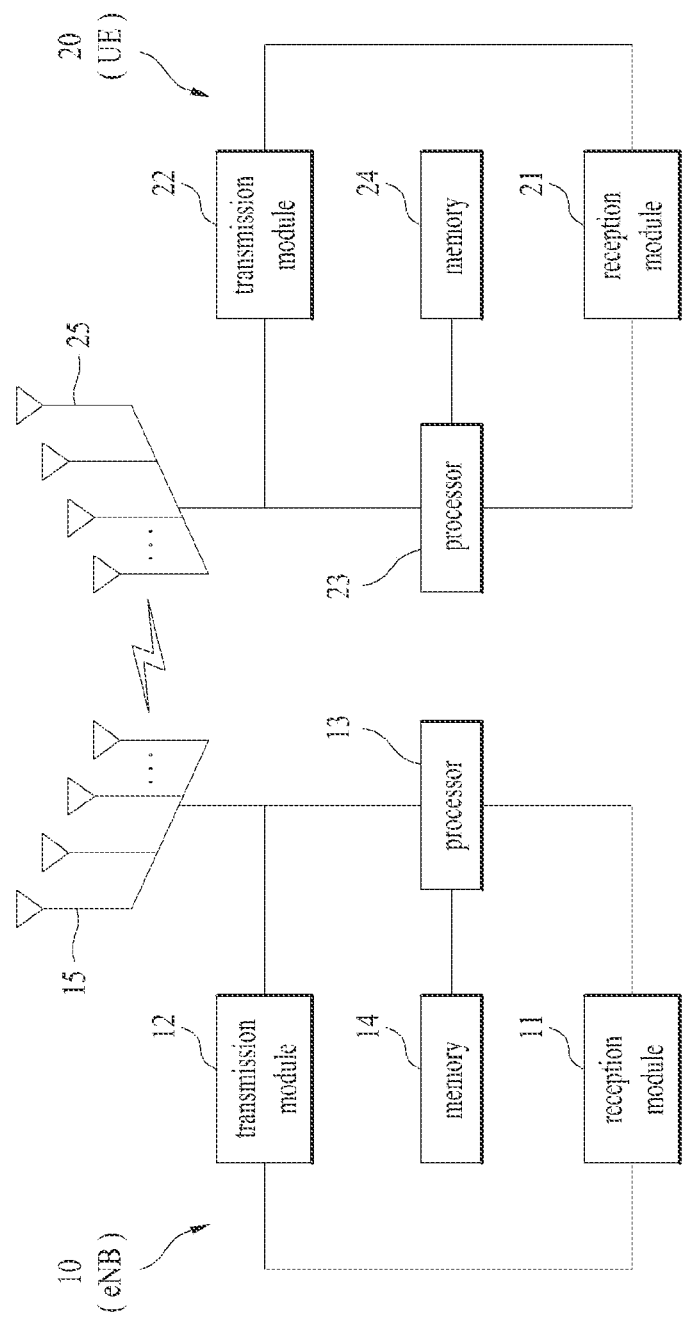
FIG. 16 is a diagram illustrating the configurations of transmitting and receiving devices.

FIG. 16 is a block diagram of a transmission point and a UE according to an embodiment of the present disclosure.

Referring to FIG. 16, a transmission point 10 according to the present disclosure may include a receiving device 11, a transmitting device 12, a processor 13, a memory 14, and a plurality of antennas 15. Use of the plurality of antennas 15 means that the transmission point 10 supports MIMO transmission and reception. The receiving device 11 may receive various UL signals, data, and information from a UE. The transmitting device 12 may transmit various DL signals, data, and information to a UE. The processor 13 may provide overall control to the transmission point 10.

The processor 13 of the transmission point 10 according to an embodiment of the present disclosure may process requirements for each of the foregoing embodiments.

The processor 13 of the transmission point 10 may function to compute and process information received by the transmission point 10 and information to be transmitted to the outside. The memory 14 may store the computed and processed information for a predetermined time, and may be replaced by a component such as a buffer (not shown).

With continued reference to FIG. 16, a UE 20 according to the present disclosure may include a receiving device 21, a transmitting device 22, a processor 23, a memory 24, and a plurality of antennas 15. Use of the plurality of antennas 25 means that the UE 20 supports MIMO transmission and reception. The receiving device 21 may receive various DL signals, data, and information from an eNB. The transmitting device 22 may transmit various UL signals, data, and information to an eNB. The processor 23 may provide overall control to the UE 20.

The processor 23 of the UE 20 according to an embodiment of the present disclosure may process requirements for each of the foregoing embodiments. Specifically, the processor may perform measurements in units of first-TTI resource, select a first-TTI resource close to a first-TTI resource having a measurement result greater than or equal to a predetermined value, and transmit a signal in the selected first-TTI resource.

The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown).

The specific configuration of the transmission point and the UE may be implemented such that the details described in the various embodiments of the present disclosure may be applied independently or implemented such that two or more of the embodiments are applied at the same time. For clarity, a redundant description is omitted.

In the example of FIG. 16, the description of the transmission point 10 may also be applied to a relay as a DL transmission entity or a UL reception entity, and the description of the UE 20 may also be applied to a relay as a DL reception entity or a UL transmission entity.

The embodiments of the present disclosure may be implemented through various means, for example, in hardware, firmware, software, or a combination thereof.

In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The above-described embodiments of the present disclosure are applicable to various mobile communication systems.

What is claimed is:

1. A method for transmitting a sidelink signal using a plurality of carriers, by a user equipment (UE), in a wireless communication system supporting device-to-device (D2D) communication, the method comprising:
sensing first transmission candidate resources for each of the plurality of carriers;
calculating, for each of the plurality of carriers, a ratio of second transmission candidate resources having overlapped time resource over the carriers among the first transmission candidate resources;
selecting at least two carriers in which the ratio is greater than or equal to a predetermined threshold value among the plurality of carriers;
selecting transmission resources for each of the at least two carriers based on the first transmission candidate resources or the second transmission candidate resources; and
transmitting the sidelink signal using the at least two carriers in the transmission resources.

2. The method of claim 1, wherein the transmission resources for each of the at least two carriers are selected only within the second transmission candidate resources.

3. The method of claim 2, wherein the transmission resources for each of the at least two carriers are randomly selected only within the second transmission candidate resources.

4. The method of claim 1, wherein the UE determines a transmission time of the sidelink signal based on one carrier of the at least two carriers.

5. The method of claim 4, wherein the one carrier is a carrier having the highest priority among the at least two carriers.

6. The method of claim 4, wherein the one carrier is a carrier having a low congestion level among the at least two carriers.

7. The method of claim 6, wherein a congestion level is determined based on a channel busy ratio (CBR), and wherein the CBR is a ratio of occupied channels in each carrier.

8. The method of claim 4, wherein the one carrier is determined by considering at least one of a priority of transmission, a reliability level of transmission, or a latency requirement of transmission.

9. The method of claim 1, wherein the plurality of carriers are preconfigured corresponding to a plurality of sub-channels.

10. The method of claim 1, wherein based on the calculated ratio smaller than the predetermined threshold, the UE decreases the predetermined threshold.

11. The method of claim 1, wherein the determination of the first transmission candidate resources is performed by a physical layer of the UE, and
wherein the determined first transmission candidate resources are reported by the physical layer to a higher layer of the UE.

12. The method of claim 1, wherein the step of sensing is performed by a physical layer of the UE, and
wherein the step of calculating the ratio and the step of selecting the at least two carriers are performed by a higher layer of the UE.

13. A user equipment (UE) for transmitting a sidelink signal using a plurality of carriers in a wireless communication system supporting device-to-device (D2D) communication, the UE comprising:
a transceiver; and
a processor configured to sense first transmission candidate resources for each of the plurality of carriers, calculate, for each of the plurality of carriers, a ratio of second transmission candidate resources having overlapped time resource over the carriers among the first transmission candidate resources, select at least two carriers in which the ratio is greater than or equal to a predetermined threshold value among the plurality of carriers, select transmission resources for each of the at least two carriers based on the first transmission candidate resources or the second transmission candidate resources and control the transceiver to the sidelink signal using the at least two carriers in the transmission resources.

14. The UE of claim 13, wherein the transmission resources for each of the at least two carriers are selected only within the second transmission candidate resources.

* * * * *